United States Patent
Cieslinski

(10) Patent No.: US 8,344,307 B2
(45) Date of Patent: Jan. 1, 2013

(54) IMAGE SENSOR

(75) Inventor: Michael Cieslinski, Ottobrunn (DE)

(73) Assignee: Arnold & Richter Cine Technik GmbH & Co. Betriebs KG (DE)

( * ) Notice: Subject to any disclaimer, the term of this patent is extended or adjusted under 35 U.S.C. 154(b) by 370 days.

(21) Appl. No.: 12/765,059

(22) Filed: Apr. 22, 2010

(65) Prior Publication Data

US 2011/0101204 A1  May 5, 2011

(30) Foreign Application Priority Data

Apr. 27, 2009  (DE) .......................... 10 2009 019 034

(51) Int. Cl.
   *H01L 27/148* (2006.01)
(52) U.S. Cl. ............. 250/208.1; 250/214 R; 250/214 A; 330/59; 330/308; 348/300
(58) Field of Classification Search ............... 250/208.1, 250/214 R, 214 A, 214 LA, 214 LS; 330/59, 330/110, 308; 348/300, 302, 303, 308
   See application file for complete search history.

(56) References Cited

U.S. PATENT DOCUMENTS

| 6,975,356 | B1 | 12/2005 | Miyamoto |
| 7,205,522 | B2 * | 4/2007 | Krymski .................... 250/208.1 |
| 7,382,408 | B2 | 6/2008 | Rossi |
| 7,456,876 | B2 | 11/2008 | Funakoshi et al. |
| 2002/0056810 | A1 | 5/2002 | Kobayashi |
| 2005/0264665 | A1 | 12/2005 | Endo |
| 2012/0062773 | A1 * | 3/2012 | Cieslinski ..................... 348/300 |

FOREIGN PATENT DOCUMENTS

| DE | 69918899 T2 | 7/2005 |
| EP | 2037668 A2 | 3/2009 |
| GB | 2387985 A | 10/2003 |
| WO | 2004074789 A1 | 9/2004 |
| WO | 2006113271 A1 | 10/2006 |

OTHER PUBLICATIONS

European Search Report relating to EP 10003909.8 dated Sep. 15, 2010 and Translation thereof.
German Search Report of German Patent Application No. 10 2009 019 034.1, dated Jun. 30, 2009; with English Translation thereof.

* cited by examiner

*Primary Examiner* — Kevin Pyo
(74) *Attorney, Agent, or Firm* — Amster, Rothstein & Ebenstein LLP

(57) ABSTRACT

The invention relates to an image sensor, in particular to a CMOS sensor, having a plurality of light sensitive pixels arranged in rows and columns for the generation of output signals proportional to the exposure, wherein column lines are associated with the columns to supply the output signals to at least one column amplifier for amplification, wherein the at least one column amplifier cooperates with the column lines such that the amplification of the respective output signal depends on the capacitance of the respective column line.

8 Claims, 3 Drawing Sheets

IMAGE SENSOR

The present invention relates to an image sensor, in particular to a CMOS image sensor, in particular to an active pixel sensor (APS), having a plurality of light sensitive pixels arranged in rows and columns for the generation of output signals which are proportional to the exposure and which are in particular voltage signals, with column lines being associated with the columns to supply the output signals for amplification to at least one column amplifier which is in particular made as a voltage amplifier.

Known electronic cameras frequently use an image sensor in CMOS technology which includes a plurality of pixels arranged in rows and columns which convert light incident through an objective of the camera into electric output signals, in particular voltages, with a respective voltage being proportional to a charge which was generated by exposure in the respective pixel.

A read-out circuit, which is usually arranged at the margin of the image field of the image sensor formed by the pixels, receives the output signals of the pixels for further processing via column lines. In the processing, the output signals are typically stored and amplified, with a respective reference signal corresponding to an uncharged pixel being taken into account in addition to the respective actual output signal in a correlated double sampling for noise suppression and a difference formation taking place between the output signal and the reference signal. The amplified (difference) signals can then be output in analog form by one or more outputs of the image sensor or can be digitized by one or more analog-to-digital converters and output digitally. A difference formation can, however, also only be carried out after the analog-to-digital conversion.

The pixels of today's image sensors only have a very small pixel size so that only low inherent noise of the image sensor can be tolerated for high light sensitivity. The signal-to-noise ratio of the output signals can generally be substantially improved in that a respective amplifier is already integrated into the pixel itself since then all following noise sources can only have an effect on the already amplified output signals. Such an amplifier, however, requires additional space so that the portion of the light sensitive surface in the total surface of a pixel becomes even smaller. It is therefore not practical as a rule already to integrate amplifiers into the pixels themselves.

A pixel of a CMOS image sensor therefore usually has only a simple transistor which is connected as a source follower. It is only able to drive the respective pixel signal to the respective column line (current amplification). Voltage amplification is, however, not possible with this.

The voltage amplification therefore usually only takes place in the aforesaid read-out circuit at the margin of the image field. For this purpose, at least one capacitor is located at the end of a respective column line and the respective output signal is buffered therein and is subsequently amplified—optionally reduced by the aforesaid reference signal buffered in a further capacitor—by a column amplifier associated with the respective column line. A separate such column amplifier is usually associated with each column line.

An image sensor of the initially named kind can be made, for example, as shown in FIG. 1 in which only one single pixel 10 is shown as a representative.

The pixel 10 shown includes a light sensitive diode 11 which is coupled to a supply voltage VPIX via a switch 13 (reset transistor). The node formed between the diode 11 and the switch 13 is connected to the gate of a transistor 12 connected as a source follower. The drain of the transistor 12 is connected to the supply voltage VPIX. The source of the transistor 12 is connected via a switch 14 (select transistor) to a column line 20 which is associated with the pixel 10 and which as a rule extends through the total image field—or half the image field, provided that the image file is read out "upwardly" and "downwardly". The column line 20 is provided to connect the pixels arranged in the associated column, in particular pixels 10, to a column amplifier circuit 40 associated with the column. The column line 20 can furthermore be connected to ground via a switch 22 before it reaches the column amplifier circuit 40.

The column amplifier circuit 40 includes a capacitor 43 whose one electrode can be connected to the column line 20 leading off in the direction of the image field via a switch 42 and to ground via a switch 41. The other electrode of the capacitor 43 is connected to the inverting input of an operation amplifier serving as a column amplifier 46. The non-inverting input of the column amplifier 46 is connected to a reference voltage VREF. The output 47 of the column amplifier 46 is fed back to the inverting input of the column amplifier 46. The feedback takes place via a feedback capacitor 45 which can be bridged by means of a switch 44 connected in parallel.

The read-out of an output signal from the pixel 10 of the image sensor in accordance with FIG. 1 takes place as follows:

First, the switch 13 is briefly closed to charge the diode 11 or the node between the diode 11 and the switch 13 to the supply voltage VPIX. The switch 44 is closed and all other switches 13, 14, 22, 41, 42 are opened for the subsequent exposure. A number of electrons proportional to the exposure is generated in the diode 11 during the exposure, with the voltage applied to the diode 11 reducing accordingly.

The switch 22 is then briefly closed to ground the column line 20. This has the purpose of discharging the column line 20 which has a parasitic capacitance due to the technology. The parasitic capacitance is illustrated by a capacitor 21 connected to ground.

Next, the switches 14, 42 are closed. The column line 20 now adopts a voltage which corresponds to the difference between the voltage applied to the diode 11 and the gate-source voltage of the transistor 12. This voltage also drops over the capacitor 43 or is also buffered in the capacitor 43. The capacitor 43 is accordingly the hold element of a hold circuit connected upstream of the column amplifier 46.

Subsequently, the switches 14, 42, 44 are opened and the switch 41 is then closed. The column amplifier 46 now amplifies the output signal stored in the capacitor 43, with the amplified signal being able to be tapped at the output 47 of the column amplifier 46. The amplification of the output signal stored in the capacitor 43, i.e. the amplification factor, with which the output signal stored in the capacitor 43 is amplified by the column amplifier 46, corresponds in this respect at least substantially to the ratio of the capacitance of the capacitor 43 to the capacitance of the capacitor 45.

No reference signal is taken into account in FIG. 1 purely for reasons of simplicity. The reference signal can be read out directly after the charging of the diode 11 to the supply voltage and before the exposure. The reference signal and the output signal can be read out after one another and in each case as described above, can in particular be buffered in the capacitor 43 and can be amplified by the amplifier 46. A difference between the amplified signals is then only formed in a device connected downstream of the amplifier 46. Alternatively, the reference signal can, however, also be buffered in a further capacitor, not shown, and applied to the non-inverting input of the column amplifier 46 so that a difference formation already takes place by the amplifier 46.

In today's image sensors, the capacitor 43 has a capacitance of, for example, 0.5 pF. The noise voltage (so-called kTC noise) of an 0.5 pF capacitor amounts to approximately 90 µV at room temperature. The surface-related capacitance of a capacitor amounts to approximately 1 fF/µm² with today's CMOS technology. With a pixel size of 2.5 µm×2.5 µm, the aforesaid capacitor thus already has a size of 2.5 µm×200 µm.

It generally applies that the noise voltage of a capacitor is the smaller, the larger the capacitance of the capacitor. To halve the aforesaid kTC noise, for example, and thus to double the signal-to-noise ratio of the output signals, the capacitance of the aforesaid capacitor and thus its surface requirement would have to be quadrupled. This is not justifiable as a rule for reasons of efficiency which is primarily measured by the chip surface.

It is the underlying object of the invention to provide an image sensor of the initially named kind which has a better signal-to-noise ratio with respect to known image sensors and which can at the same time be manufactured at a favorable cost.

This object is satisfied by an image sensor having the features of the present. invention and in particular in that the at least one column amplifier cooperates with the column lines such that the amplification of the respective output signal depends on the capacitance of the respective column line.

It was recognized in accordance with the invention that the parasitic capacitance of the respective column line which is anyway present can be used directly and immediately for the amplification of the respective output signal so that a separate capacitor which is arranged between the respective column line and the respective column amplifier can be dispensed with. The capacitance of the respective column line itself is used as an amplification-determining circuit element in the aforesaid column amplifier circuit.

The column lines of today's large-format image sensors have a capacitance from approximately 5 to 10 pF. The kTC noise of the image sensor can be substantially reduced by the use of these comparatively high capacities as active elements for the amplification of the output signals and chip surface can be saved in so doing.

Generally, a respective hold circuit with a holding element can be associated with the columns for the buffering of the respective output signal, with the image sensor being designed so that the output signal stored in the hold element is subsequently amplified and with the hold element being formed by the respective column line.

The column lines can preferably be connected to the respective column amplifier via a respective switch, with the image sensor being designed so that the respective switch is opened for the buffering of the respective output signal and/or the respective switch is closed for the amplification of the respective output signal. The buffering of the respective output signal in the column line can be separated time-wise from the amplification of the respective output signal by the switch.

The amplification is preferably the higher, the larger the capacitance of the respective column line is.

A respective feedback capacitor is in particular associated with the respective column amplifier, with the amplification of the respective output signal depending on the ratio of the capacitance of the respective column line to the capacitance of the respective feedback capacitor. The feedback capacitor in particular formed as a degenerative feedback capacitor can be arranged in series with the respective column line and/or parallel to the respective column amplifier.

To increase the dynamic range of the image sensor, the amplification of the respective output signal can take place with one respective amplifier in two mutually separate channels, with the two channels having different amplifications. Both channels can then be read out independently of one another and their amplified signals can be combined with one another, with an image with a higher dynamic range arising overall. The combination of the amplified signals of the two channels can in this respect take place such that the amplified signal of the channel with the higher amplification is used as the basis for further use with a low exposure, the amplified signal of the channel with the lower amplification is used as the basis for further use with a high exposure and a signal calculated from the amplified signals of the two channels in a transition range is used as the basis for further use.

It is preferred in this respect if the image sensor is designed so that the amplification in the first channel depends on the capacitance of the respective column line and is larger than the amplification in the second channel, with the amplification in the second channel depending on the capacitance of a respective capacitor which is arranged between the column line and the amplifier of the second channel. The first channel having the higher amplification uses the respective column line as a storage capacitor for the respective output signal, as is described above, whereas the second channel having the lower amplification provides a separate capacitor known from the prior art for the buffering of the respective output signal.

The capacitance of the named capacitor of the respective second channel is in particular smaller than the capacitance of the respective column line. The capacitance of the respective column line can—dependent on the length—amount, for example, to 5 pF and a size can be selected for the respective capacitor, for example, which results in a capacitance of 1 pF.

The named capacitor of the second channel can preferably be connected to the respective column line via a respective further switch, with the image sensor being designed such that the respective further switch is closed for the buffering of the respective output signal and/or the respective further switch is opened for the amplification of the respective output signal. The buffering of the respective output signal in the capacitor can be separated time-wise from the amplification of the respective output signal by the further switch.

Advantageous embodiments of the invention are also set forth in the dependent claims, in the description of the Figures and in the drawing.

Non-restricting embodiments of the invention are shown in the drawing and will be described in the following:

Figure 1:
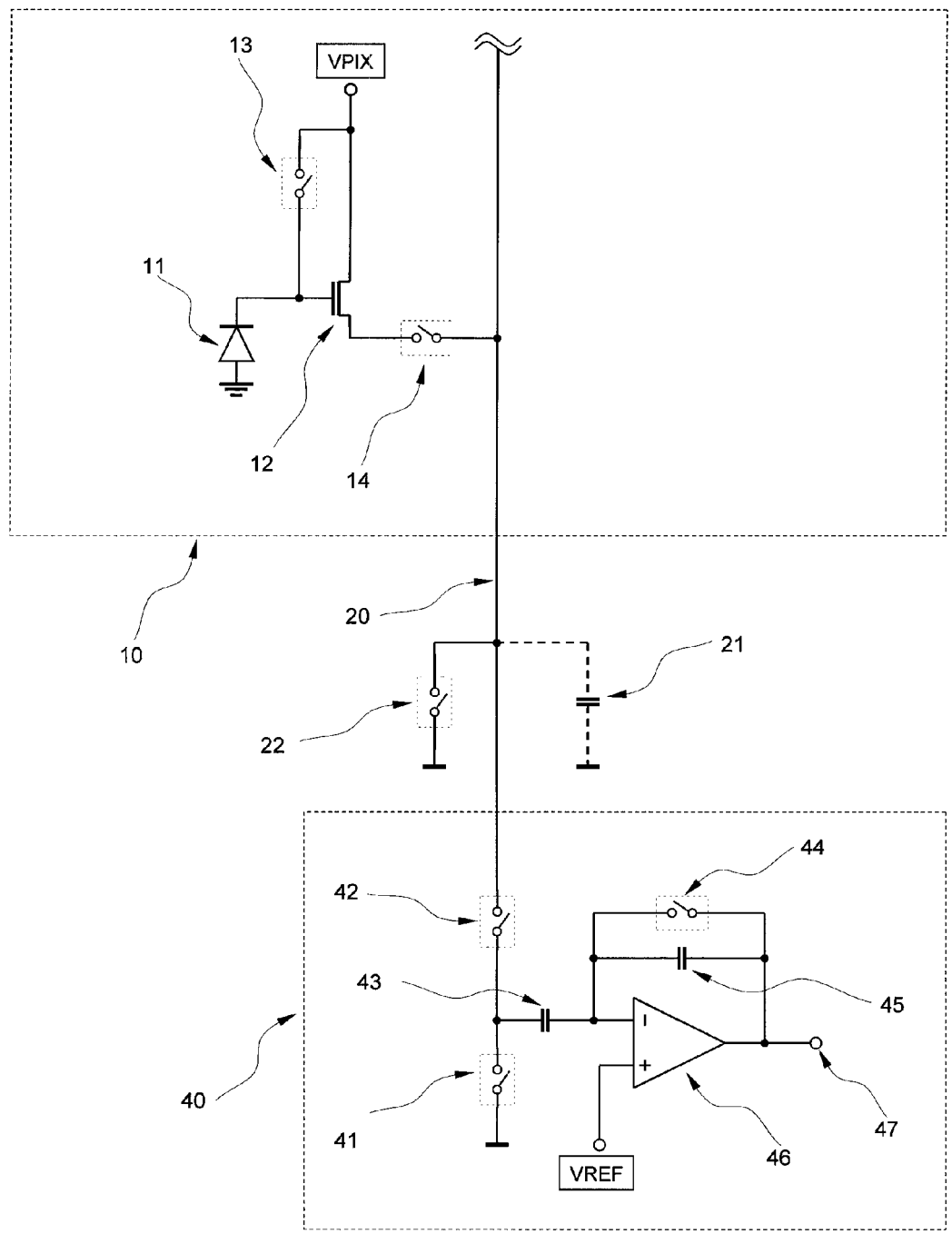
FIG. 1 shows a CMOS image sensor in accordance with the prior art, with only one pixel of the image sensor and a column amplifier circuit associated with the pixel being shown.
Figure 2:
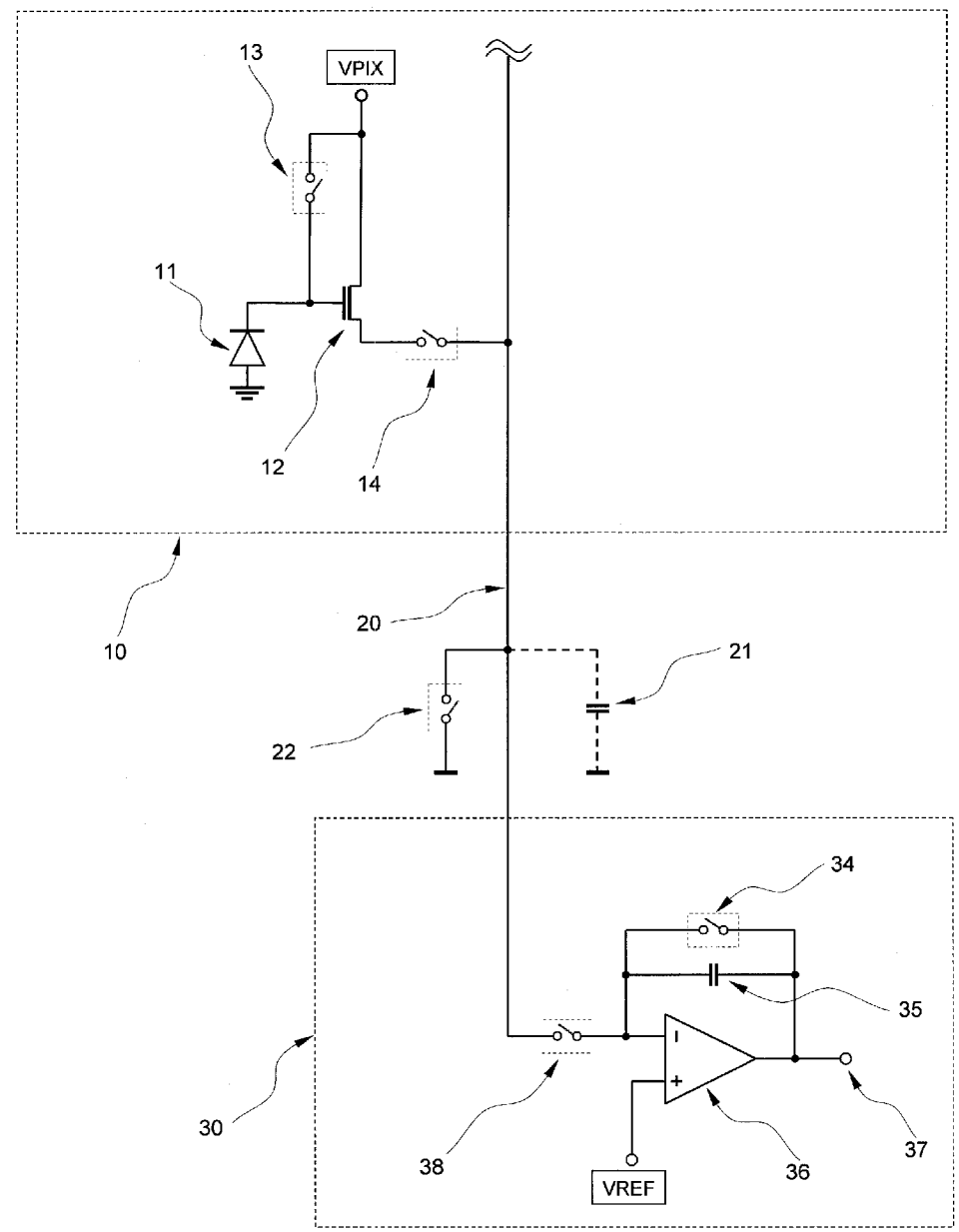
FIG. 2 shows a CMOS image sensor in accordance with a first embodiment of the present invention.

The image sensor in accordance with the invention shown in FIG. 2, which is an active pixel sensor (APS), includes a pixel field or image field with a plurality of pixels which are arranged in rows and columns and of which only one pixel 10 is shown. Each pixel 10 is formed as in FIG. 1. A separate column line 20 with a respective switch 22 is associated with each column. Each column line 20 and each switch 22 is made as in FIG. 1. A separate column amplifier circuit 30 is associated with each column line 20. Each column amplifier circuit 30 includes a column amplifier 36, an output 37, a feedback capacitor 35 and a switch 34, as are described in connection with FIG. 1.

Unlike the column amplifier circuit 40 of the image sensor in accordance with FIG. 1, the column amplifier circuit 30 of the image sensor in accordance with FIG. 2, however, does not include any separately formed capacitor 43 which is connected between the column line 20 leading off in the direction of the image field and the column amplifier 36. Furthermore, in the column amplifier circuit 30 of the image sensor in accordance with FIG. 2, instead of the two switches 41, 42 of the column amplifier circuit 30 of the image sensor in accordance with FIG. 1, only one switch 38 is provided which connects the column line 20 to the inverting input of the column amplifier 36.

The readout of an output signal from the pixel 10 of the image sensor in accordance with FIG. 2 takes place as follows:

First, the switch 13 is briefly closed to charge the diode 11 or the node between the diode 11 and the switch 13 to the supply voltage VPIX. The switch 34 is closed and all other switches 13, 14, 22, 38 are opened for the subsequent exposure. A number of electrons proportional to the exposure is generated in the diode 11 during the exposure, with the voltage applied to the diode 11 reducing accordingly.

The switch 22 is then briefly closed to ground the column line 20. This has the purpose of discharging the column line 20 which has a parasitic capacitance due to the technology. The parasitic capacitance is illustrated by a capacitor 21 connected to ground.

Next, the switch 14 is closed. The column line 20 now adopts a voltage which corresponds to the difference between the voltage applied to the diode 11 and the gate-source voltage of the transistor 12. This voltage is buffered in the column line 20 acting as a capacitor. The column line 20 is accordingly the hold element of a hold circuit connected upstream of the column amplifier 36.

Subsequently, the switches 14, 34 are opened and the switch 38 is then closed. The column amplifier 36 now amplifies the output signal stored in the column line 20, said output signal being a voltage signal, in particular a voltage signal which does not depend, or whose value does not depend, on the capacitance of the column line 20, with the amplified signal being able to be tapped at the output 37 of the column amplifier 36 which is made as a voltage amplifier. The amplification of the output signal stored in the column line 20, i.e. the amplification factor with which the output signal stored in the column line 20 is amplified by the column amplifier 36, in this respect corresponds at least substantially to the ratio of the capacitance of the column line 20 to the capacitance of the capacitor 35.

The parasitic capacitance of the column line 20 amounts, for example, to 5 pF and the capacitance of the capacitor 35, for example, to 1 pF. An amplification of 5 is thus achieved, for example.

Typically, directly after the charging of the diode 11 to the supply voltage VPIX and before the exposure, a reference signal is first read out which corresponds to an uncharged pixel to carry out the initially explained difference formation. This can take place, for example, in accordance with the method already described on the prior art.

The kTC noise of the image sensor can be reduced by the use of the comparatively high parasitic capacitance of the column line 20 as an active amplification-determining element for the amplification of the output signal and at the same time—since the otherwise required capacitor known from the prior art can be dispensed with—chip surface can be saved.

Figure 3:
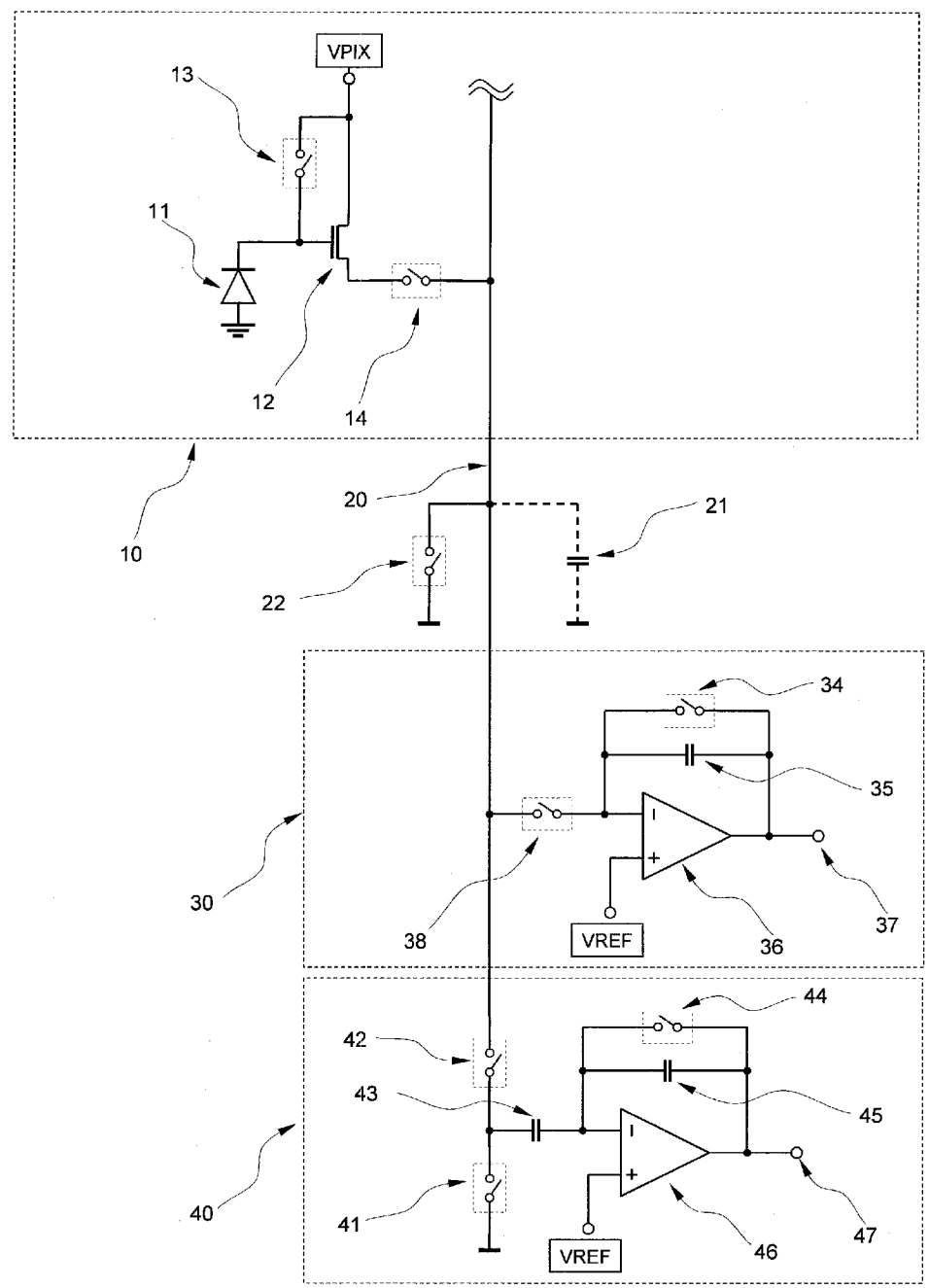
FIG. 3 shows a CMOS image sensor in accordance with a second embodiment of the present invention.

The image sensor in accordance with the invention shown in FIG. 3 has two mutually separate amplification circuits 30, 40 or channels in which the output signal is respectively amplified. The amplifier circuit 30 of the image sensor in accordance with FIG. 3 (first channel) corresponds to the amplifier circuit 30 of the image sensor in accordance with the invention in accordance with FIG. 2. The amplifier circuit 40 of the image sensor in accordance with FIG. 3 (second channel) corresponds to the amplifier circuit 30 of the image sensor in accordance with FIG. 1 known from the prior art.

The readout of an output signal from the pixel 10 of the image sensor in accordance with FIG. 3 takes place as follows:

First, the switch 13 is briefly closed to charge the diode 11 or the node between the diode 11 and the switch 13 to the supply voltage VPIX. The switch 34, 44 is closed and all other switches 13, 14, 22, 38, 41, 42 are opened for the subsequent exposure. A number of electrons proportional to the exposure is generated in the diode 11 during the exposure, with the voltage applied to the diode 11 reducing accordingly.

The switch 22 is then briefly closed to ground the column line 20. This has the purpose of discharging the column line 20 which has a parasitic capacitance due to the technology. The parasitic capacitance is illustrated by a capacitor 21 connected to ground.

Next, the switches 14, 42 are closed. The column line 20 now adopts a voltage which corresponds to the difference between the voltage applied to the diode 11 and the gate-source voltage of the transistor 12. This voltage also drops over the capacitor 43 or is also buffered in the capacitor 43. The column line 20 is accordingly the hold element of a hold circuit connected upstream of the column amplifier 36 of the first channel. The capacitor 43 is accordingly the hold element of a hold circuit connected upstream of the column amplifier 46 of the second channel.

Subsequently, the switches 14, 42, 34, 44 are opened and then the switches 38, 41 are closed. The column amplifier 36 now amplifies the output signal stored in the column line 20. The column amplifier 46 amplifies the output signal stored in the capacitor 43. The parasitic capacitance of the column line 20 amounts, for example, to 5 pF and the capacitance of the capacitor 35, for example, to 1 pF. An amplification of 5 is thus reached, for example, in the first channel 30. The capacities of the capacitors 43 and 45 amount to 1 pF in each case, for example. An amplification of 1 is thus reached, for example, in the second channel 40.

Both a high sensitivity (due to the first channel with high amplification and low kTC noise with a low exposure) and a high level control (due to the second channel with lower amplification with high exposure) can therefore be reached by the use of the two channels 30, 40.

It must still be noted with respect to the embodiments explained above that the respective pixel 10 can also have a different structure to generate output signals proportional to the exposure. Four transistors or a different number can in particular be provided instead of the shown three transistors 12, 13, 14.

Reference Numeral List 10 pixel
11 diode
12 transistor
13 switch
14 switch
20 column line
21 column line as capacitor
22 switch
30 column amplifier circuit
34 switch
35 feedback capacitor
36 column amplifier 37 output
38 switch
40 column amplifier circuit
41 switch
42 switch
43 capacitor
44 switch
45 feedback capacitor
46 column amplifier
47 output

The invention claimed is:

1. An image sensor having a plurality of light sensitive pixels (10) arranged in rows and columns for the generation of output signals proportional to the exposure, wherein column lines (20) are associated with the columns to supply the output signals to at least one column amplifier (36) for amplification,
characterized in that
the at least one column amplifier (36) cooperates with the column lines (20) such that the amplification of the respective output signal depends on the capacitance of the respective column line (20), wherein the amplification of the respective output signal takes place with one respective amplifier (36, 46) in two mutually separate channels (30, 40), the two channels (30, 40) have different amplifications, the image sensor is designed such that the amplification in the first channel (30) depends on the capacitance of the respective column line (20) and is larger than the amplification in the second channel (40), and the amplification in the second channel (40) depends on the capacitance of a respective capacitor (43) which is arranged between the respective column line (20) arid the respective amplifier (46) of the second channel (40).

2. An image sensor in accordance with claim 1, wherein a respective hold circuit (20, 22, 38) with a holding element (20) is associated with the columns for the buffering of the respective output signal, wherein the image sensor is designed so that the output signal stored in the hold element is subsequently amplified and wherein the hold element (20) is formed by the respective column line (20).

3. An image sensor in accordance with claim 1, wherein the column lines (20) can be connected to the respective column amplifier (36) via a respective switch (38), wherein the image sensor is designed so that the respective switch (38) is opened for the buffering of the respective output signal and/or the respective switch (38) is closed for the amplification of the respective output signal.

4. An image sensor in accordance with claim 1, wherein a larger capacitance of the respective column line (20) results in a higher amplification of the respective output signal.

5. An image sensor in accordance with claim 1, wherein a respective feedback capacitor (35) is associated with the respective column amplifier (36) and wherein the amplification of the respective output signal depends on the ratio of the capacitance of the respective column line (20) to the capacitance of the respective feedback capacitor (35).

6. An image sensor in accordance with claim 5, wherein the feedback capacitor (35) is arranged in series with the respective column line (20) and/or parallel to the respective column amplifier (36).

7. An image sensor in accordance with claim 1, wherein the capacitance of the respective capacitor (43) of the second channel (40) is lower than the capacitance of the respective column line (20).

8. An image sensor in accordance with claim 1, wherein the respective capacitor (43) of the second channel (40) can be connected to the respective column line (20) via a respective further switch (42) and wherein the image sensor is designed so that the respective further switch (42) is closed for the buffering of the respective output signal and/or the respective further switch (42) is opened for the amplification of the respective output signal.

* * * * *